United States Patent [19]

Inglis

[11] 4,024,632

[45] May 24, 1977

[54] DRAWING IN TOOL

[75] Inventor: Sydney David Inglis, Beverly Hills, Australia

[73] Assignee: James N. Kirby Limited, Revesby, Australia

[22] Filed: June 21, 1976

[21] Appl. No.: 698,159

[30] Foreign Application Priority Data

June 16, 1975 Australia ............................ 2371/75

[52] U.S. Cl. .................................. 29/736; 29/596; 29/606
[51] Int. Cl.$^2$ ...................................... H02K 15/06
[58] Field of Search ......... 29/205 D, 205 E, 205 R, 29/596, 598, 606

[56] References Cited

UNITED STATES PATENTS

| | | | |
|---|---|---|---|
| 2,432,267 | 12/1947 | Adamson | 29/205 D X |
| 3,402,462 | 9/1968 | Walker et al. | 29/205 D X |
| 3,559,268 | 2/1971 | Droll | 29/205 D |
| 3,717,918 | 2/1973 | Droll | 29/205 R |
| 3,815,207 | 6/1974 | Habegger | 29/205 R |

*Primary Examiner*—Carl E. Hall

[57] ABSTRACT

This invention relates to apparatus for inserting prewound coils into the slots of a stator or of a field carrying member of a dynamoelectric device wherein pinching the coils during the insertion stage is reduced and wherein damage to the lamellae of the apparatus is substantially reduced.

5 Claims, 4 Drawing Figures

DRAWING IN TOOL

This invention relates to an improved device for the insertion of pre-wound coils into stator grooves in the production of electrical machines.

It is known, for example according to the Hill, U.S. Pat. No. 3,324,536, issued June 13, 1967, to insert pre-wound coils into stator grooves by the use of a star-shaped stripper member having a plurality of slots in its outer periphery between the radially extending points or teeth of the stripper member. Elongated fingers or lamellae are inserted into the slots and the stripper member is slidable axially relative to the position of the lamellae. Pre-wound coils are initially placed onto these fingers as the latter extends through the centre of a stator. The stripper member is then moved through the centre of the stator, sliding along the fingers to remove the coils from the fingers and insert the same into the stator grooves.

A disadvantage of this prior art apparatus is the pinching of the pre-wound coils as they move into the stator grooves. Pinching occurs because the diameter of the pre-wound coil is too large either relative to the width of the opening of the stator groove or relative to the distance between two adjacent lamalle. Attempts have been made to overcome this disadvantage by varying the space between the lamellae but this has not been very successful. Consequently this type of prior art apparatus is of little use with pre-wound coils of relatively large diameter.

Another prior art apparatus attempted to overcome this problem comprised a stripper member mounted for axial movement through a stator, with lamellae inserted into slots in the stripper member as described above, characterised in that alternate lamellae are fixed to the stripper member for movement therewith through the stator to reduce relative frictional movement between the pre-wound coil associated with adjacent radially extending points of the stripper member and their respective adjacent lamellae. See the Droll, U.S. Pat. No. 3,559,268, issued Feb. 2, 1971, for this prior art.

This prior art apparatus reduced the pinching problem, but the pinching of the pre-wound coil is still a major disadvantage of this apparatus. As the wires are being inserted there is a tendency for the wires to pull the moving lamellae sideways and consequently reduced the adjacent gap which tends to cause jamming and damage to the wires in that gap. If the lamellae are slightly bent, the slot gaps tend to be uneven thus increasing further the possibility of jamming. Further, when the star-shaped stripper member reaches the top of its stroke, the wire being pulled into the stator has a tendency to pull and break the moving lamellae off from their fixing point to the stripper member. Small screws are all that are usually used to fix the lamellae to the stripper member.

To reduce lateral movement of the lamellae, radially extending ridges or guides can be provided on opposite edges of the face of each lamella opposing a ridge of the stator between adjacent stator grooves. These radially extending guides act as wire guards and help to prevent pinching of the coils. However, the radially extending guides have to be relatively thick to give them some in-built strength against breakage, and this tends to reduce the width of the opening into the stator groove, thus limiting the diameter of the wire or coil which can pass through the entrance into the groove. If the guards are made too thin, they tend to break or chip as a result of sideways movement of the lamella. The jagged edge of the guard tends to catch when the stripper member is passed through the stator, and further tends to damage the wire or coil.

It is an object of this invention to provide a device for inserting pre-wound coils into stator grooves, and which overcomes the disadvantages of the prior art. The device according to the present invention is designed to prevent the lamellae moving in any direction. As a consequence, the wire guards on the lamellae can be made thinner, allowing for insertion of larger gauge wires into the stator grooves. The life of the lamellae is infinitely longer than with known types. Further, the resultant reduction in wire damage gives, as a consequence, a reduction in finished motor rejects.

The invention provides a device for inserting or drawing in pre-wound coils into grooves of stators or the like comprising:

a. a stripper member mounted for movement through a stator, said stripper member including a plurality of equally spaced radially extending projections positioned about the periphery of the stripper member, each said projection being positioned across from a stator groove;

b. lamella members located in planes passing between the projections of the said stripper member and extending in a direction parallel to the direction of relative movement between the stripper member and the stator;

c. a locating member, which is stationary relative to the movement of the stripper member through said stator, the peripheral cross-sectional configuration of part of which corresponds to that of the said stripper member, said locating member being adapted to receive the ends of the lamella members, and d. a locking ring member adapted to cooperate with said locating member to lock ends of lamella members in position on the locating member; characterised in that the ends of each lamella member is adapted to be locked into position on said locating member by means of said locking ring member.

Preferably, alternate lamella members are fixed to the stripper member for movement therewith through the stator, to reduce relative frictional movement between the pre-wound coil associated with a given stripper member projection and its adjacent lamellae. Here the top ends of the stationary lamellae are locked in position on the locating member.

A further preferred feature is for opposite edges of each lamella face opposing a ridge of the stator between adjacent stator grooves to be provided with projecting ridge or guide such that the lamella covers the edges of the entrance into the stator groove.

The invention will be further described by reference to drawings depicting a preferred embodiment of the invention. It is to be understood that the following description and the drawings relate only to a preferred embodiment, and in no way limit the scope of the invention. In the drawings, FIG. 1 is a sectional view through a device according to the present invention showing a stationary lamella, a lamella fixed to the movable stripper member, the locating member and its associated locking ring;

Figure 2:
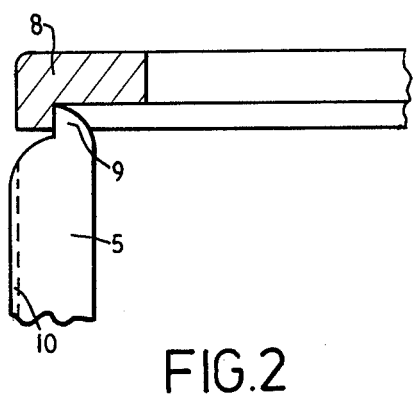
FIG. 2 is an enlarged view of portion of the device of FIG. 1, showing the locking ring, the shape of the lamella adapted to co-operate with the locking ring and ridges or guides on the lamella to prevent damage to the coil.
Figure 1:
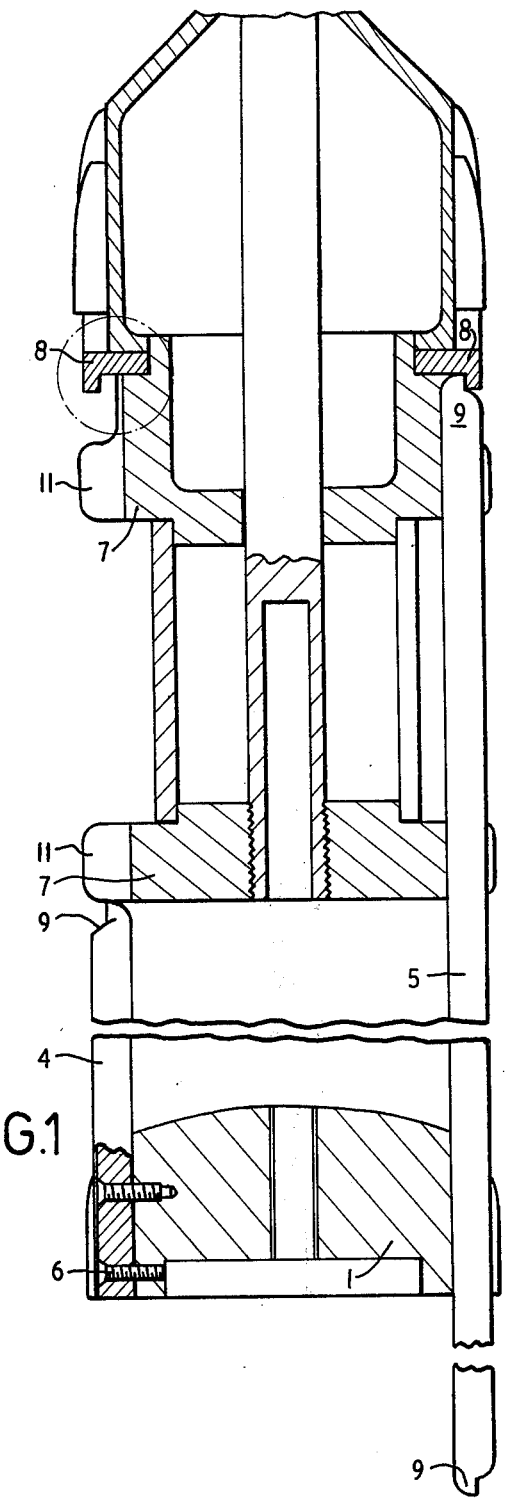

The device of the present invention includes a star-shaped stripper member 1 having a plurality of teeth or ridges 2 extending outwardly in a radial direction, with slots 3 between the ridges. Lamellae 4 and 5 located within the slots 3. Alternate lamellae, such as 4, are fixed to the stripper member by means of screws 6. The remaining lamellae, such as 5 are locked in position in the locating member 7 by means of a locking ring member 8. The lamellae are shaped as at 9 to fit under the ridge of the locking ring member 8. The lamellae are provided with projecting ridges 10 the purpose of which is explained below. The lamellae are guided into position on the locating member by means of slots 11 on the locating member which correspond to slots 3 on the stripper member.

Figure 3:
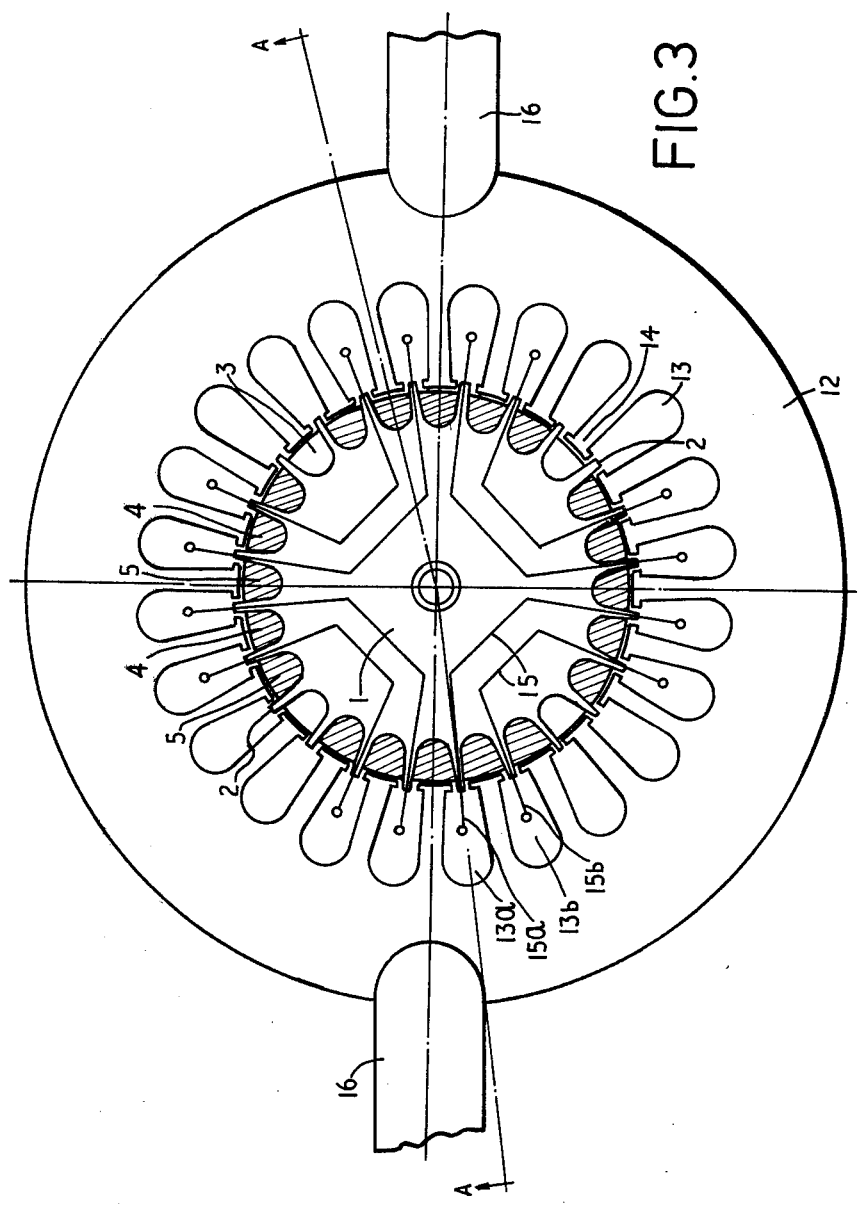
FIG. 3 is a plan view of a stator with the stripper member passing therethrough showing lamellae and prewound coils.
Figure 4:
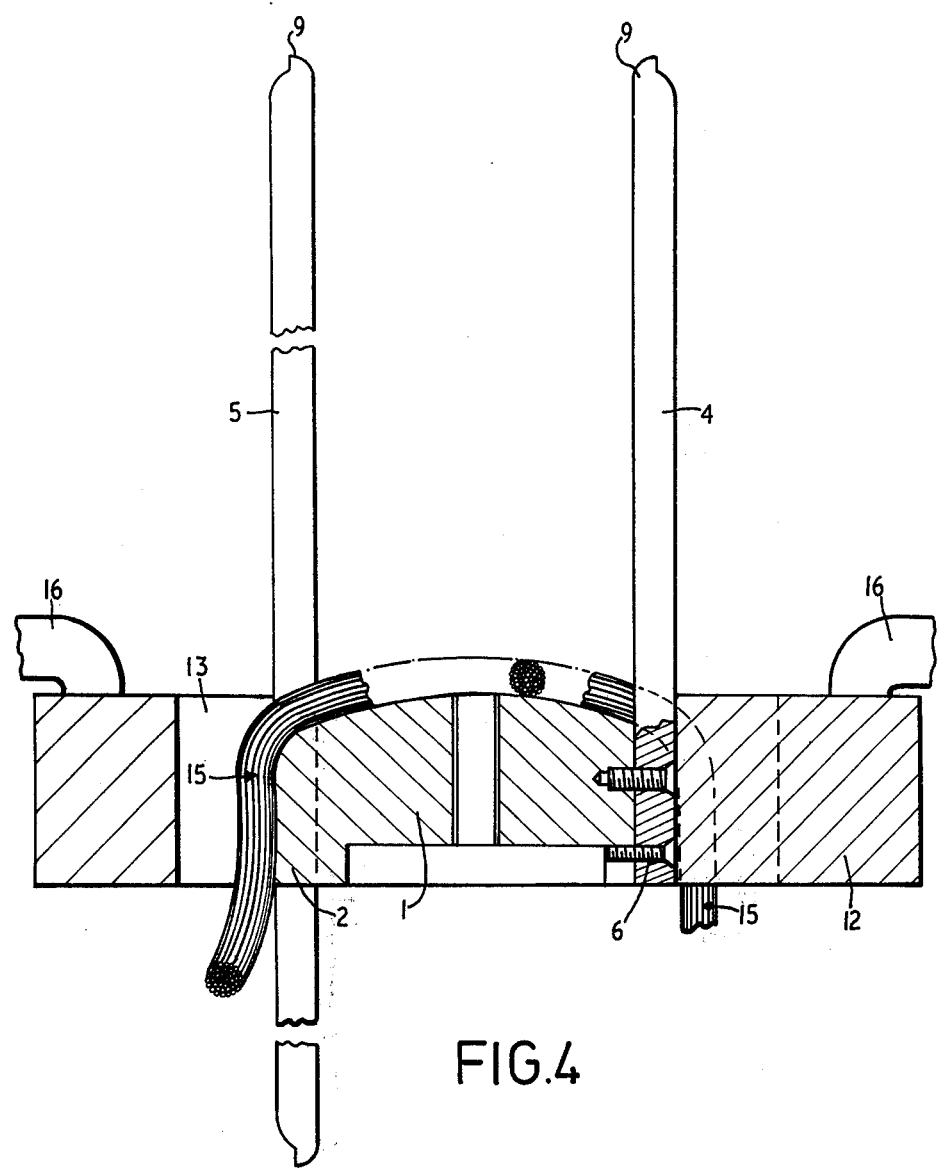
FIG. 4 is a sectional view taken along line A—A of FIG. 3 showing the stripper member guiding a prewound coil into a stator groove.

Also shown in FIGS. 3 and 4 is a stator 12 having a plurality of grooves 13 and ridges 14. Each stator groove 13 is located directly across from the outer periphery of a stripper member tooth 2. Each stator ridge 14 is located directly across from a lamella 4 or 5, and the projecting ridges 10 of the lamellae cover the edges of the outer periphery of the stator ridges. FIGS. 3 and 4 also show separate pre-wound coils 15. The outer portions of each of these coils are to be inserted into grooves 13 (e.g. coil 15a into groove 13a, coil 15b into groove 13b and so on). Means 16 are provided for supporting the stator during the coil insertion operation.

The device of the present invention operates as follows:

Before the stator 12 is brought into the vicinity of the device the pre-wound coils are located on the stripper member 1 so that the outer portions of the coils each lie on a tooth or ridge 3 thereof between intervals 3 each of which contains a lamella 4 or 5. In FIG. 3, 8 separate coils are shown. Each alternate lamella 4 is fixed to the stripper member by means of screws 6. The remaining adjacent lamellae are of the fixed type 5 and are fixed to the base of the apparatus and to the locating member 7 by means of the locking ring member 8 holding the shaped ends 9 of the lamellae.

With the coils in place on the lamellae of the stripper member, the stator 12 is placed above the stripper member with its grooves lying each across from one tooth 2 of stripper member. The stripper member is then moved upwardly through the stator as the outer portion of the tooth 2 and the rounded upper portion of the stripper member 1 force the prewound coils into their respective grooves. FIG. 4 illustrates this step just as the stripper member 1 is passing through the stator and one end of the coil 15 is being forced into its respective groove 13.

The facts that alternate lamellae are attached to the movable stripper member that the remaining adjacent lamellae are locked into position on the locating member and that the lamellae are provided with projecting edges 10 to cover the peripheral edges of the stator ridges 14 effectively ensure that pre-wound coils will be inserted into their relevant stator grooves and that jamming of, and damage to, the coils is greatly decreased or eliminated. The positive top location of the lamellae prevents bending or flexing thereof and prevents the breakage of the lamella ridges.

It will be apparent to those skilled in the art that the invention is capable of numerous modifications without departing from the intended scope thereof.

I claim:

1. A device for inserting pre-wound coils into grooves of stators comprising:
    a. a stripper member mounted for movement through a stator, said stripper member including a plurality of equally spaced radially extending projections positioned about periphery of the stripper member, each said projection being positioned across from a stator groove;
    b. lamella members located in planes passing between the projections of the said stripper member and extending in a direction parallel to the direction of relative movement between the stripper member and the stator;
    c. a locating member, which is stationary relative to the movement of the stripper member through said stator, the peripheral cross-sectional configuration of part of which corresponds to that of the said stripper member, said locating member being adapted to receive the ends of the lamella members, and
    d. a locking ring member adapted to cooperate with said locating member to lock ends of lamella members in position on the locating member; characterized in that the ends of each lamella member is adapted to be locked into position on said locating member by means of said locking ring member.

2. A device according to claim 1 wherein a lamella on at least one side of each said radially extending projection having a pre-wound coil associated therewith is fixed to the stripper member for movement therewith.

3. A device according to claim 1 wherein the opposite edges of each lamella face opposing a ridge of the stator between adjacent stator grooves is provided with a projecting ridge or guide such that the lamella covers the edges of the entrance into the stator groove.

4. A device according to claim 1 wherein the ends of each lamella are shaped to fit under a peripheral ridge on said locking ring member.

5. A device according to claim 1, wherein the stripper member and the locating member are provided with axially extending slots on the peripheral edges thereof between the said radially extending projections, said slots extending through both the stripper member and the locating member in a direction parallel to the direction of movement of the stripper member relative to the stator and the locating member, wherein a portion of the cross-section of each lamella member may be located in said slots, wherein alternate lamella members are slidable in the slots on the locating member but are fixed to the stripper member in respective alternate slots thereof for movement therewith through the stator and the locating member, and wherein the remainder of the lamella members are slidable in the slots in both the stripper member and the locating member in a direction parallel to the direction of movement of the stripper member relative to the stator and the locating member.

* * * * *